United States Patent
Vrbaski et al.

(10) Patent No.: US 9,392,534 B2
(45) Date of Patent: Jul. 12, 2016

(54) PRIORITIZATION OF ACCESS POINTS BY AN ANDSF SERVER

(71) Applicant: ALCATEL-LUCENT CANADA, INC., Ottawa (CA)

(72) Inventors: Mira Vrbaski, Kanata (CA); Ivaylo Tanouchev, Ottawa (CA); Hamdy Farid, Kanata (CA)

(73) Assignee: Alcatel Lucent, Boulogne-Billancourt (FR)

( * ) Notice: Subject to any disclaimer, the term of this patent is extended or adjusted under 35 U.S.C. 154(b) by 182 days.

(21) Appl. No.: 14/162,076

(22) Filed: Jan. 23, 2014

(65) Prior Publication Data
US 2015/0208326 A1    Jul. 23, 2015

(51) Int. Cl.
*H04W 48/16* (2009.01)
*H04W 48/08* (2009.01)
*H04W 48/04* (2009.01)
*H04W 48/14* (2009.01)
*H04W 48/18* (2009.01)

(52) U.S. Cl.
CPC .............. *H04W 48/16* (2013.01); *H04W 48/08* (2013.01); *H04W 48/04* (2013.01); *H04W 48/14* (2013.01); *H04W 48/18* (2013.01)

(58) Field of Classification Search
None
See application file for complete search history.

(56) References Cited

U.S. PATENT DOCUMENTS

2013/0034019 A1* 2/2013 Mustajarvi ............ H04W 48/16
370/254

(Continued)

OTHER PUBLICATIONS

"3GPP TS 23.327; Technical Specification Group Services and System Aspects; Mobility between 3GPP-Wireless Local Area Network interworking and 3GPP system; published Mar. 2013; Version 11.0.0", pp. 1-27.

"3GPP TS 23.402; Technical Specification Group Core Network and Terminals Architecture Enhancements for non-3GPP accesses; Published Sep. 2013; Version 12.2.0", pp. 1-255.

(Continued)

*Primary Examiner* — Kodzovi Acolatse
(74) *Attorney, Agent, or Firm* — Kramer & Amado, P.C.

(57) ABSTRACT

Various exemplary embodiments relate to a method, network node, and non-transitory machine-readable storage medium including one or more of the following: identifying, by an ANDSF server, a location associated with a UE in communication with the ANDSF server via an S14 session over a first access network; determining a plurality of access points for use by the UE to utilize at least one access network other than the first access network; calculating a first score for a first access point; calculating a second score for a second access point; generating a policy identifying the first access point associated with a first priority and the second access point associated with a second priority, wherein the first priority is set higher than the second priority based on a comparison of the first score to the second score; and transmitting the policy to the UE.

17 Claims, 6 Drawing Sheets

(56) References Cited

U.S. PATENT DOCUMENTS

| | | | |
|---|---|---|---|
| 2013/0143542 A1* | 6/2013 | Kovvali | H04W 48/18 455/418 |
| 2013/0208696 A1* | 8/2013 | Garcia Martin | H04W 36/32 370/331 |
| 2014/0071854 A1* | 3/2014 | Xiang | H04W 48/18 370/254 |
| 2014/0092886 A1* | 4/2014 | Gupta | H04W 52/0212 370/338 |
| 2014/0133294 A1* | 5/2014 | Horn | H04W 28/0247 370/230 |
| 2014/0153546 A1* | 6/2014 | Kim | H04W 48/18 370/332 |
| 2014/0204745 A1* | 7/2014 | Nuss | H04W 28/08 370/232 |
| 2014/0295913 A1* | 10/2014 | Gupta | H04W 88/06 455/552.1 |
| 2015/0131483 A1* | 5/2015 | Colban | H04W 48/16 370/254 |

OTHER PUBLICATIONS

"3GPP TS 24.302; Technical Specification Group Core Network and Terminals access to 3GPP evolved packet core via non-3GPP access networks stage 3; Published Sep. 2013; Version 12.2.0", pp. 1-67.

"3GPP TS 24.312; Technical Specification Group Core Network and Terminals Access Network Discovery and election function management object published Sep. 2013; Version 12.2.0", pp. 1-173.

* cited by examiner

| | CRITERIA (410) | RESULT (420) |
|---|---|---|
| 430 | TAC = 0xA13 | ISMP PROFILE 1; ISRP PROFILE 7 |
| 440 | TAC = 0xA23 && SUBSCRIBER CATEGORY = GOLD | ISMP PROFILE 8; ISMP PROFILE 1; ISRP PROFILE 7 |
| 450 | DEFAULT | ISMP PROFILE 10; ISRP PROFILE 10 |
| 460 | . . . | . . . |

| | GEOFENCE NAME (510) | LOCATIONS (520) |
|---|---|---|
| 530 | CAPITOL AREA | TAC = 0x4E9, 0x4EA, 0x4EB |
| 540 | MALL | TAC = 0xBB4 \| PLMN = 0x11 |
| 550 | . . . | . . . |

| | | |
|---|---|---|
| 610 | NAME | ISMP PROFILE 1 |
| 620 | PLMN | 444123 |
| 630 | VALIDITY AREA | GEOFENCE: CAPITOL AREA |
| 640 | LIST OF NETWORK ELEMENTS | NE2; NE3; NE4; NE7; NE8 |
| 650 | USE ALL NETWORK ELEMENTS | NO |
| 660 | ALGORITHM | PROXIMITY |

FIG. 7

| | |
|---|---|
| NAME | ISRP PROFILE 7 |
| PLMN | 310010 |
| FLOW BASED CRITERIA | FB1 |
| IP FLOWS | IPFLOW2 |
| SOURCE RANGE | 1.1.1.1:111-2.2.2.2:222 |
| DESTINATION RANGE | 3.3.3.3:133-4.4.4.4:144 |
| APPLICATION | STREAMING VIDEO |
| ROUTING CRITERIA | RC1 |
| VALIDITY AREA | GEOFENCE:CAPITOL HILL |
| TIME OF DAY | 2014-11-11@9:00:00 2014-11-12@11:00:00 |
| ROUTING RULES | NE2; NE3; NE4; NE7; NE8 |

| | |
|---|---|
| NAME | NE2 |
| UTILIZATION | 0 |
| WEIGHT | 40 |
| ACCESS NETWORK SELECTION RULES | SUBSCRIBER_CATEGORY!= PLATINUM; UTILIZATION > 80 |
| GEO LOCATION | 33.759;-84.401 |
| TIME OF DAY | MON-THURS(0:00:00-6:00:00) FRI-SAT(3:30:00-6:00:00) |
| CUSTOM DATA | PARTNER=ATT-PARTNER |
| ACCESS TYPE | WiFi |
| SSID | ATT_PARTNER |
| BSSID | 00:24:6c:c3:64:dc |
| ACCESS INFORMATION | JxJqzPeT |

800 — 805, 810, 815, 820, 825, 830, 835, 840, 845, 850, 855

US 9,392,534 B2

PRIORITIZATION OF ACCESS POINTS BY AN ANDSF SERVER

CROSS-REFERENCE TO RELATED APPLICATIONS

This application is related to the following co-pending applications, which are hereby incorporated by reference for all purposes as if fully set forth herein: application Ser. No. 14/105,453; and application Ser. No. 14/162,147.

TECHNICAL FIELD

Various exemplary embodiments disclosed herein relate generally to access network discovery and selection and, more particularly but not exclusively, to access network discovery and selection function (ANDSF) servers and clients.

BACKGROUND

The evolution of cell phone and other communications has yielded numerous protocols and access networks for enabling communication between user equipment (UE) and the Internet or other networks. For example, access networks have been established according to LTE, 3GPP, CDMA (3GPP2), WiMAX, and WiFi standards. Increasingly, UEs such as smart phones are implementing the capability to connect to multiple types of access networks. For example, it is now common for smart phones to enable connection to WiFi access networks in addition to a cellular access network such as LTE. However, such UEs do not generally implement intelligent methods of deciding which access network to utilize and when; instead, it is often up to the user to manually enable communication via the desired access network.

The third generation partnership project (3GPP) is currently developing a number of standards defining an "access network discovery and selection function" (ANDSF) for aiding the UE in automatically selecting alternative access networks for supporting some or all of the network traffic produced by the UE. However, while these standards provide general guidance on how an ANDSF should behave in some contexts, the standards are mostly silent on the internal operations of the various devices involved.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments relate to a method performed by an access network discovery and selection function (ANDSF) server for provisioning policies, the method comprising: identifying, by an ANDSF server, a location associated with a user equipment device (UE) in communication with the ANDSF server via an S14 session established over a first access network; retrieving a policy rule from a plurality of policy rules, wherein the policy rule includes a first portion for determining applicability of the policy rule and a second portion for determining a policy to be provisioned when the policy rule is applicable; determining, based on evaluating the first portion of the policy rule using the location associated with the UE, that the policy rule is applicable to the S14 session; generating, in response to determining that the policy rule is applicable to the S14 session, a policy based on the second portion of the policy rule, wherein the policy includes an identification of an access point for use by the UE to access a second access network other than the first access network; and transmitting the policy including the identification of the access point to the UE via the S14 session over the first access network.

Various embodiments relate to a access network discovery and selection function (ANDSF) server for provisioning policies, the ANDSF server comprising: a network interface in communication with a first access network; a storage device configured to store a plurality of policy rules, wherein a policy rule of the plurality of policy rules includes a first portion for determining applicability of the policy rule and a second portion for determining a policy to be provisioned when the policy rule is applicable; and a processor in communication with the network interface and the storage device, wherein the processor is configured to: identify a location associated with a user equipment device (UE) in communication with the ANDSF server via an S14 session established over the network interface; retrieve the policy rule from a plurality of policy rules; determine, based on evaluating the first portion of the policy rule using the location associated with the UE, that the policy rule is applicable to the S14 session; generate, in response to determining that the policy rule is applicable to the S14 session, a policy based on the second portion of the policy rule, wherein the policy includes an identification of an access point for use by the UE to access a second access network other than the first access network; and transmit the policy including the identification of the access point to the UE via the S14 session over the network interface.

Various embodiments relate to a non-transitory machine-readable storage medium encoded with instruction for execution by an access network discovery and selection function (ANDSF) server for provisioning policies, the non-transitory machine-readable storage medium comprising: instructions for identifying, by an ANDSF server, a location associated with a user equipment device (UE) in communication with the ANDSF server via an S14 session established over a first access network; instructions for retrieving a policy rule from a plurality of policy rules, wherein the policy rule includes a first portion for determining applicability of the policy rule and a second portion for determining a policy to be provisioned when the policy rule is applicable; instructions for determining, based on evaluating the first portion of the policy rule using the location associated with the UE, that the policy rule is applicable to the S14 session; instructions for generating, in response to determining that the policy rule is applicable to the S14 session, a policy based on the second portion of the policy rule, wherein the policy includes an identification of an access point for use by the UE to access a second access network other than the first access network; and instructions for transmitting the policy including the identification of the access point to the UE via the S14 session over the first access network.

Various embodiments are described wherein identifying the location comprises receiving, from the UE, a request for a policy, wherein the request identifies the location as a current location of the UE.

Various embodiments additionally include determining, based on evaluating respective first portions of the plurality of policy rules, that the policy rules are inapplicable to an additional S14 session; retrieving a default policy rule based on determining that the policy rules are inapplicable to a second S14 session; generating an additional policy based on the default policy rule; and transmitting the additional policy via the additional S14 session.

Various embodiments are described wherein the second portion includes a reference to a policy profile and generating the policy based on the second portion of the policy rule comprises: retrieving a policy profile based on the reference to the policy profile, and evaluating the policy profile to generate at least a portion of the policy.

Various embodiments are described wherein evaluating the policy profile comprises generating at least one of an inter-system mobility policy (ISMP) and an inter-system routing policy (ISRP) to be included in the policy.

Various embodiments are described wherein the second portion includes an ordered list of policy profile references, and generating the policy based on the second portion of the policy rule comprises: evaluating a first policy profile associated with a first policy profile reference from the ordered list to generate a first portion of the policy; evaluating a second policy profile associated with a second policy profile reference from the ordered list to generate a second portion of the policy; and providing the first portion of the policy with a higher priority than the second portion of the policy based on the relative locations of the first policy profile reference and the second policy profile reference in the ordered list.

Various embodiments are described wherein evaluating the first portion of the policy rule using the location associated with the UE comprises evaluating the first portion of the policy rule using the location and subscriber information associated with the UE.

Various embodiments relate to a method performed by an access network discovery and selection function (ANDSF) server for provisioning policies, the method comprising: identifying, by an ANDSF server, a location associated with a user equipment device (UE) in communication with the ANDSF server via an S14 session established over a first access network; determining a plurality of access points for use by the UE to utilize at least one access network other than the first access network; calculating a first score, using a first score formula, for a first access point of the plurality of access points; calculating a second score, using the first score formula, for a second access point of the plurality of access points; generating a policy identifying the first access point associated with a first priority and the second access point associated with a second priority, wherein the first priority is set higher than the second priority based on a comparison of the first score to the second score; and transmitting the policy to the UE via the S14 session over the first access network.

Various embodiments relate to a access network discovery and selection function (ANDSF) server for provisioning policies, the ANDSF server comprising: a network interface in communication with a first access network; a storage device; and a processor in communication with the network interface and the storage device, wherein the processor is configured to: identify a location associated with a user equipment device (UE) in communication with the ANDSF server via an S14 session established over the network interface; determine a plurality of access points for use by the UE to utilize at least one access network other than the first access network; calculate a first score, using a first score formula, for a first access point of the plurality of access points; calculate a second score, using the first score formula, for a second access point of the plurality of access points; generate a policy identifying the first access point associated with a first priority and the second access point associated with a second priority, wherein the first priority is set higher than the second priority based on a comparison of the first score to the second score; and transmit the policy to the UE via the S14 session over the network interface.

Various embodiments relate to a non-transitory machine-readable storage medium encoded with instructions for execution by an access network discovery and selection function (ANDSF) server for provisioning policies, the non-transitory machine-readable storage medium comprising: instructions for identifying, by an ANDSF server, a location associated with a user equipment device (UE) in communication with the ANDSF server via an S14 session established over a first access network; instructions for determining a plurality of access points for use by the UE to utilize at least one access network other than the first access network; instructions for calculating a first score, using a first score formula, for a first access point of the plurality of access points; instructions for calculating a second score, using the first score formula, for a second access point of the plurality of access points; instructions for generating a policy identifying the first access point associated with a first priority and the second access point associated with a second priority, wherein the first priority is set higher than the second priority based on a comparison of the first score to the second score; and instructions for transmitting the policy to the UE via the S14 session over the first access network.

Various embodiments are described wherein identifying the location comprises receiving, from the UE, a request for a policy, wherein the request identifies the location as a current location of the UE.

Various embodiments additionally include calculating a third score, using a second score formula other than the first score formula, for a third access point of the plurality of access points, wherein the policy additionally identifies the third access point associated with a third priority that is determined based on a comparison of the third score to the first and second score.

Various embodiments are described wherein the first score formula comprises a weight assigned to a respective access point and a recent utilization rating of the respective access point.

Various embodiments are described wherein the first score formula is previously configured by an operator to be used by the ANDSF server.

Various embodiments are described wherein determining the plurality access points comprises evaluating a policy profile to generate a list of access points including the first access point and the second access point; and generating the policy comprises creating a first policy element based on the policy profile, wherein the first policy element identifies the first access point associated with the first priority and the second access point associated with the second priority, wherein the first policy element is at least one of an inter system routing policy (ISRP) and an inter system mobility policy (ISMP).

Various embodiments are described wherein the policy includes a second policy element that is at least one of an ISRP and an ISMP, the first policy element is associated with a first element priority within the policy, and the second policy element is associated with a second element priority within the policy.

BRIEF DESCRIPTION OF THE DRAWINGS

In order to better understand various exemplary embodiments, reference is made to the accompanying drawings, wherein:

FIG. 4 illustrates an exemplary data arrangement for storing policy rules;

FIG. 5 illustrates an exemplary data arrangement for storing GeoFence definitions;

FIG. 6 illustrates an exemplary data arrangement for storing an inter system mobility policy (ISMP) profile;

FIG. 7 illustrates an exemplary data arrangement for storing an inter system routing policy (ISRP) profile;

FIG. 8 illustrates an exemplary data arrangement for storing a network element object;

To facilitate understanding, identical reference numerals have been used to designate elements having substantially the same or similar structure or substantially the same or similar function.

DETAILED DESCRIPTION

The description and drawings presented herein illustrate various principles. It will be appreciated that those skilled in the art will be able to devise various arrangements that, although not explicitly described or shown herein, embody these principles and are included within the scope of this disclosure. As used herein, the term, "or," as used herein, refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

Figure 1:
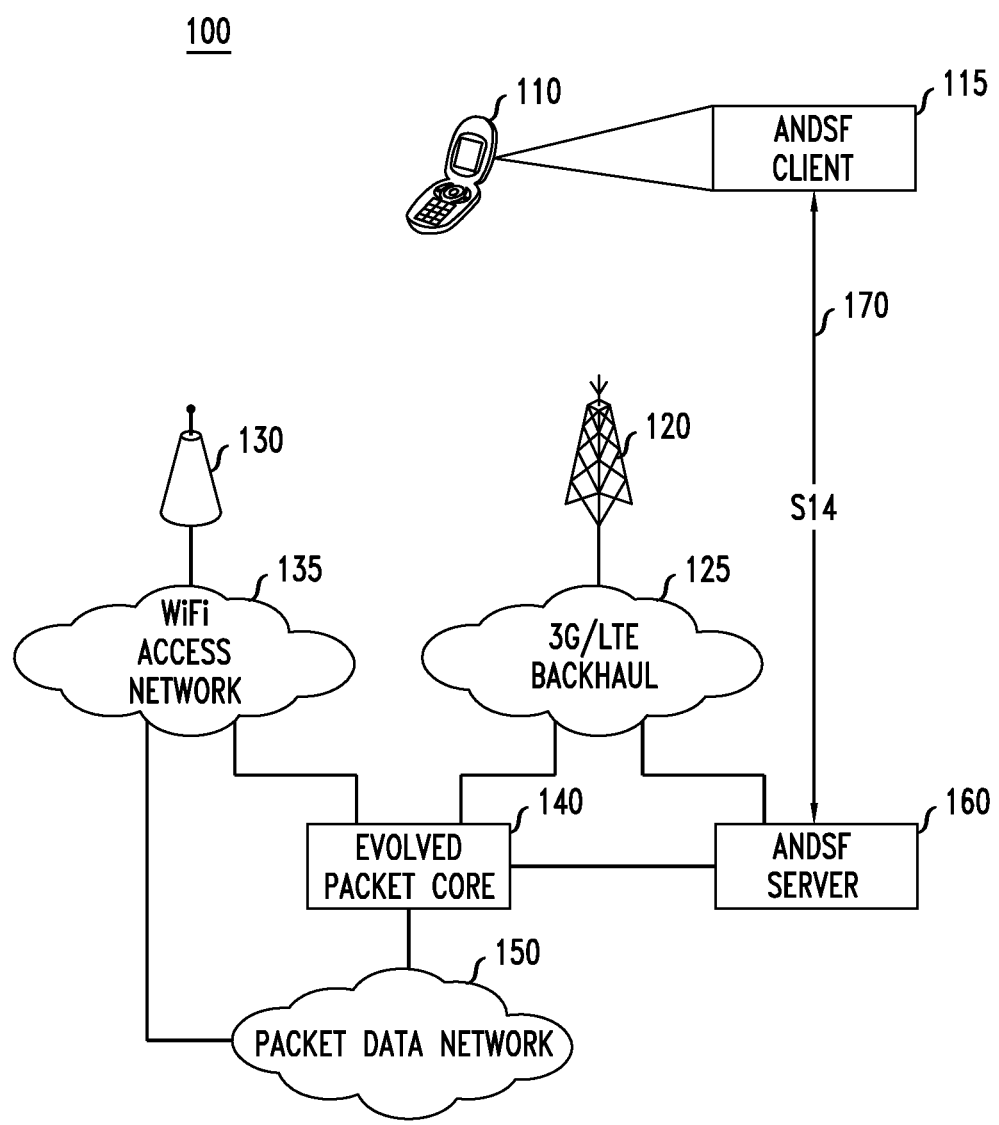
FIG. 1 illustrates an exemplary environment for enabling communication via multiple access networks.

FIG. 1 illustrates an exemplary environment 100 for enabling communication via multiple access networks. The exemplary environment 100 may be a telecommunications network for providing user equipment (UE) 110 with access to a packet data network (PDN) 150, such as the Internet.

The UE 110 is a device that communicates with the packet data network 150 for providing the end-user with one or more data services. Such data service may include, for example, voice communication, text messaging, multimedia streaming, and Internet access. More specifically, in various exemplary embodiments, the UE 110 may be a personal or laptop computer, mobile or smart phone, tablet, television set-top box, or any other device capable of communicating with other devices via a network.

The environment 100 may include multiple routes for the UE 110 to access the PDN 150. For example, as part of a first route, the environment 110 includes a base station 120 and a 3G/LTE backhaul access network 125. The base station 120 may be a device that enables communication between user equipment 110 and the 3G/LTE backhaul access network 125. For example, the base station 120 may be a base transceiver station such as a radio network controller, nodeB, or an evolved nodeB (eNodeB) as defined by 3GPP standards. Thus, the base station 120 may be a device that communicates with the UE 110 via a first medium, such as radio waves, and communicates with the 3G/LTE backhaul access network 125 via a second medium, such as Ethernet cable. In various embodiments, multiple base stations (not shown) may be present to provide mobility to the UE 110.

The 3G/LTE backhaul access network 125 may be a series of routers, such as service aggregation routers, and other network elements configured to transport traffic to devices such as various devices belonging to an evolved packet core (EPC) 140. As will be explained in greater detail below, the EPC 140 may provide controlled and metered access to the PDN 150.

As part of a second route to the PDN 150, the exemplary environment includes a WiFi access point 130 and a WiFi access network 135. The WiFi access point 130 may be a device that enables communication between user equipment 110 and the WiFi access network 135. For example, the WiFi access point 130 may be a wireless router or other access point as defined by IEEE standards. Thus, the WiFi access point 130 may be a device that communicates with the UE 110 via a first medium, such as radio waves, and communicates with the WiFi access network 135 via a second medium, such as Ethernet cable. In various embodiments, multiple WiFi access points (not shown) may be present to provide mobility to the UE 110.

The WiFi access network 135 may be a series of routers and other network elements configured to transport traffic to devices such as various devices belonging to the EPC 140. As such, traffic that is redirected over the WiFi access network 135 may still be controlled and metered by the EPC 140 as will be detailed further below. Additionally, as shown, the WiFi access network 135 may enable non-seamless WiFi offload by providing a direct connection to the PDN, bypassing the EPC 140.

It will be appreciated that while the exemplary environment 100 is illustrated as including one WiFi access network and one 3G/LTE access network, various embodiments may include alternative or additional access networks. For example, an alternative environment (not shown) may include 3G/LTE access networks, WiFi access networks, WiMAX access networks, 3GPP access networks, or CDMA access networks. It will be apparent that the various principles described herein with respect to the 3G/LTE access network 125 and WiFi access network 135 may be applied to any combination of such access networks to achieve various benefits described herein.

The EPC 140 includes a collection of devices defined by the 3GPP to provide various services according to an LTE network. For example, the EPC 140 may include service gateways, PDN gateways, policy and charging rules function (PCRF) nodes, and subscription profile repositories (SPRs). The EPC 140 may manage UE sessions, authorize the transfer of application traffic to and from the PDN 150 upon request, enforce quality of service (QoS) limits and guarantees, meter network usage, apply charges to a subscribers account, or perform any other functions associated with an LTE EPC.

Various embodiments described herein facilitate the discovery of and selection among the available access networks 125, 135 for transport of data traffic by the UE 110. To this end, the UE 110 includes an access network discovery and selection function (ANDSF) client 115 that communicates with an ANDSF server 160 via an S14 session 170. As shown, the S14 session 170 is established via the 3G/LTE backhaul access network 125; in various embodiments, the S14 session 170 may be established over other available networks such as the WiFi access network 135 or other networks (not shown). In various embodiments, the S14 session may transfer messages on the data plane according to the Open Mobile Alliance (OMA) device management (DM) protocol. Various other protocols for the transfer of messages to implement the functionalities described herein will be apparent.

The ANDSF client 115 may establish the session by first transmitting identifying information (such as a triplet including IMSI, IMEI, and IMSISD values) to authenticate the subscriber using the UE 110. If the ANDSF server 160 is able to authenticate the subscriber as an existing and active subscriber, the ANDSF server 160 may create a new S14 session and transmit an S14 session identifier back to the ANDSF client 115 for use in future communications.

Once the S14 session 170 has been established, the ANDSF server 160 may assist the UE 110 by transmitting access network policies to the ANDSF client 115. As will be described in greater detail below, access network policies may include identifications of available access points, prioritization of access points, criteria for determining when to use various access points, or other information specified by the 3GPP as used by the UE 110 in automatically determining which access networks 125, 135 to utilize. Such policies may be delivered according to multiple procedures. In a PULL procedure, the ANDSF client 115 sends a message to the ANDSF server 160 requesting that access network policies be provided. The request message also includes information revealing the current location of the UE 110. For example, the location information may include a current cell identifier, location area code (LAC), tracking area code (TAC), public land mobile network (PLMN) identifier, GPS coordinates, or any other information useful in identifying a location. Based on the location information, the ANDSF server may identify nearby alternative access points and associated priorities, criteria, and other policy information. The generated policy is then returned to the ANDSF client 115 for use.

According to the PUSH procedure, the ANDSF server 160 provides policy information without having recently received a request from the ANDSF client 115. In other words, the ANDSF server 160 pushes an unsolicited set of policy information to the ANDSF client 115. Such a PUSH procedure may be used, for example, when policy information is modified by an operator of the ANDSF server 160 or when specifically requested by the operator. The pushed policy information may be based on the most recently reported location of the UE 110 or, as will be described in greater detail below, based on an anticipated future location of the ANDSF client 115.

Figure 2:
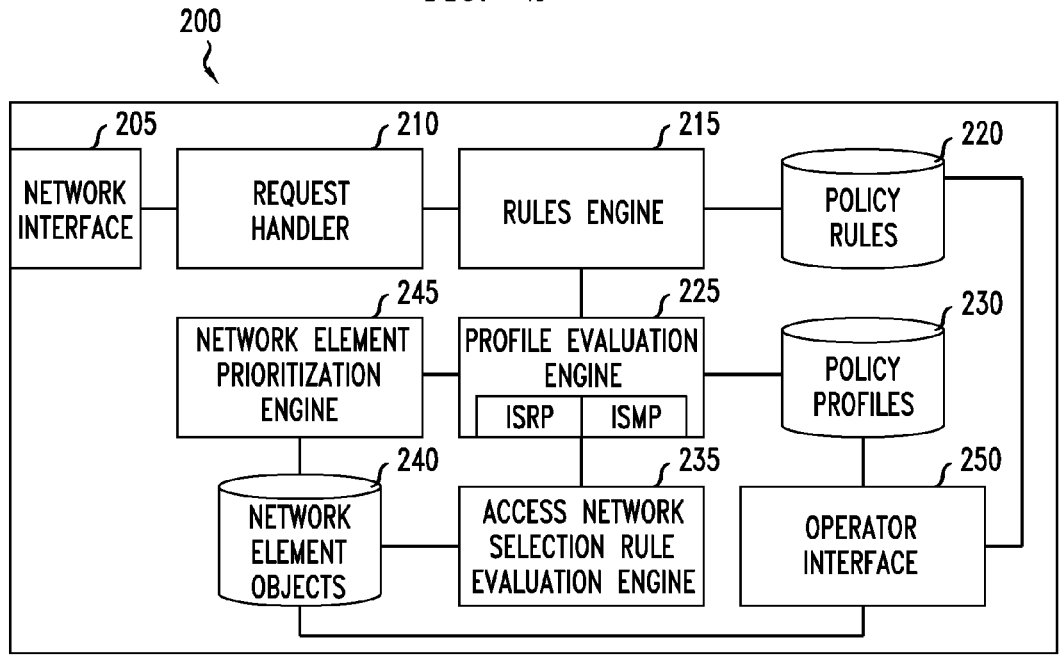
FIG. 2 illustrates an exemplary component diagram of an ANDSF server.

FIG. 2 illustrates an exemplary component diagram of an ANDSF server 200. The ANDSF server 200 may be a standalone device or may be a component of another system. For example, the ANDSF server 200 may correspond to the ANDSF server 160 of the exemplary environment 100. As another example, the ANDSF server 200 may be integrated into one of the devices belonging to the EPC 140 of the exemplary environment 100. Various other deployments for the ANDSF server 200 will be apparent.

The ANDSF server 200 includes multiple components for enabling the communications specified by the 3GPP standards. For example, as shown, the ANDSF server 200 includes a network interface 205, request handler 210, rules engine 215, and policy rules storage 220. Together, these components 205, 210, 215, 220 may facilitate responding to an ANSDF client PULL request. It will be apparent that FIG. 2 may constitute an abstraction or simplification in some respects and that additional components may be included for performing this or other functions. For example, additional components (not shown) may be included for establishing new S14 sessions. Various other modifications will be apparent.

The network interface 205 may include hardware or executable instructions on a machine-readable storage medium configured to exchange messages with other devices according to one or more communications protocols. For example, the network interface 205 may include an Ethernet or TCP/IP interface. The network interface 205 may implement various other protocol stacks such as, for example, an OMA-DM or Diameter stack. In various embodiments, the network interface 205 may include multiple physical ports.

The request handler 210 may include hardware or executable instructions on a machine-readable storage medium configured to interpret received messages to identify S14 session modification requests which include pull requests for policy information. Upon identifying such a pull request, the request handler 210 may perform authentication such as, for example, determining whether an S14 session identifier carried by the request message corresponds to an active S14 session. After verifying that the ANDSF server 200 recognizes the session with which the request is associated, the request handler 210 invokes a policy generator to create a policy for inclusion in a response message. Various embodiments may employ different methods and components for generating policies. In the exemplary ANDSF server 200, the policy generator invoked by the request handler 210 is the rules engine 215. Invocation of the rules engine 215 may include passing various information to the rules engine 215 such as, for example, location information carried by the request or subscriber information retrieved from an SPR by the request handler 210 or another component.

Upon receiving a policy back from the rules engine 215, the request handler 210 constructs a response message to the requesting ANDSF client. The response message may be formed according to the S14 protocol and carry the generated policy. The request handler 210 then sends the response message back to the ANDSF client via the network interface 205.

As noted above, in some embodiments, the ANDSF server 200 alternatively or additionally pushes policies to various ANDSF clients without first receiving a request for such a policy. In such embodiments, a component (not shown) may determine when to push a policy based on factors such as a schedule or operator action. After making such a determination, the ANDSF server 200 may operate in a manner similar to request handler 210, by invoking the rules engine 215 (or other policy generator) and constructing an S14 message to deliver the resultant policy.

The rules engine 215 may include hardware or executable instructions on a machine-readable storage medium configured to identify or otherwise generate a policy to be transmitted to an ANDSF client. The rules engine 215 evaluates one or more externalized rules stored in the policy rules storage 220 to determine, based on the context of the request, what policy should be sent to the ANDSF client. As will be described in greater detail below with respect to FIG. 4, the rules may be evaluated against context information such as a provided UE location.

The policy rules storage 220 may be any machine-readable medium capable of storing one or more rules for evaluation by the rules engine 215. Accordingly, the policy rules storage 220 may include a machine-readable storage medium such as read-only memory (ROM), random-access memory (RAM), magnetic disk storage media, optical storage media, flash-memory devices, and/or similar storage media. Exemplary contents for the policy rules storage 240 will be described in greater detail below with respect to FIG. 4.

Various embodiments of the ANDSF server 200 may utilize policy profiles to facilitate generation of components of the policy. For example, a policy profile may facilitate generation of one or more inter system mobility policy (ISMP) or inter system routing policy (ISRP) to be included in the policy transmitted to the ANDSF client. In some embodiments, the request handler 210 may invoke such policy profiles directly as part of invoking a policy generator. In other embodiments, such as the embodiment of FIG. 2, the various policy rules include references to policy profiles that are to be evaluated when a policy rule is applied. The ANDSF server 200 may include multiple components to facilitate policy profile evaluation, such as a profile evaluation engine 225, policy profiles storage 230, access network selection rule evaluation engine 235, network element objects storage 240, and network element prioritization engine 245.

The profile evaluation engine 225 may include hardware or executable instructions on a machine-readable storage medium configured to evaluate policy profiles to generate policy elements. As shown, the profile evaluation engine 225 evaluates both ISMP profiles and ISRP profiles. Upon receiving an indication of a policy profile, such as from the rules engine 215, the profile evaluation engine 225 retrieves the identified policy profile from the policy profiles storage 230. In some cases, the policy profile may simply identify the information to be included in the policy element. In such case, the profile evaluation engine 225 may simply format the component to include the information carried by the policy profile according to the S14 protocol and return the component to the rules engine 215 or other requesting component. In other cases, the profile may identify or otherwise be associated with additional processing. For example, some policy profiles may identify a list of network elements and an algorithm for eliminating some network elements from the list prior to profile component generation. In such embodiments, the profile evaluation engine 225 may be configured to apply the identified algorithm to generate an "available list" of network elements.

The policy profiles storage 230 may be any machine-readable medium capable of storing one or more profiles for evaluation by the profile evaluation engine 225. Accordingly, the policy profiles storage 230 may include a machine-readable storage medium such as read-only memory (ROM), random-access memory (RAM), magnetic disk storage media, optical storage media, flash-memory devices, and/or similar storage media. Exemplary contents for the policy profiles storage 230 will be described in greater detail below with respect to FIGS. 6-7.

In some cases, the network elements identified by a policy profile may be associated with one or more "access network selection rules" for use in further determining whether to exclude network elements from the policy element under generation. In such embodiments, the profile evaluation engine 225 may send the available list, or other network element list, to the access network selection rule evaluation engine 235. The access network selection rule evaluation engine 235 may include hardware or executable instructions on a machine-readable storage medium configured to generate an "applicable list" of network elements based on the network element objects. The access network selection rule evaluation engine 235 retrieves a network element object from the network element objects storage 240 for each network element in the received list. Then, the access network selection rule evaluation engine 235 evaluates each access network selection rule carried by the network element object. Based on the evaluation of the access network selection rules, the access network selection rule evaluation engine 235 may exclude one or more network elements from inclusion in the applicable list. After evaluating each network element, the access network selection rule evaluation engine 235 returns the applicable list to the profile evaluation engine 225.

The network element objects storage 240 may be any machine-readable medium capable of storing one or more network element objects. Accordingly, the network element objects storage 240 may include a machine-readable storage medium such as read-only memory (ROM), random-access memory (RAM), magnetic disk storage media, optical storage media, flash-memory devices, and/or similar storage media. Exemplary contents for the network element objects storage 240 will be described in greater detail below with respect to FIG. 8.

In some embodiments, the ANSDF 200 may employ one or more methods for prioritizing the list of network elements included in the policy element. In some such embodiments, upon receiving an applicable list back from the access network selection rule evaluation engine 235, the profile evaluation engine 225 passes the applicable list to the network element prioritization engine 245. The network element prioritization engine 245 may include hardware or executable instructions on a machine-readable storage medium configured to assign priorities to each network element in a received list. Upon receiving an applicable list, or other network element list, the network element prioritization engine 245 calculates a score for each network element according to a score formula. For example, the network element prioritization engine 245 may calculate the score for each network element as "score=network element weight+10*network element utilization," where the network element weight may be an operator-assigned weight carried by the associated network element object and the network element utilization may be a utilization metric reported by another device, such as a network monitor. It will be apparent that various additional formulas may be used. In some embodiments, the score formula may be configured by an operator of the ANDSF server 200 and may use additional or alternative values, such as a signal strength or subscriber information. Further, different score formulas may be provided for specific network elements or types of network elements. Various additional modifications will be apparent.

After calculating a score for each network element in the applicable list, the network element prioritization engine 245 reorders the applicable list according to the scores. For example, the network elements may be in ascending score order. Then, the network element prioritization engine 245 returns the ordered list to the profile evaluation engine 225 which may then proceed to complete generation of the policy element.

The ANDSF server 200 also enables operator configuration and, in some embodiments, includes an operator interface 250. The operator interface may include local interface components such as, for example, a monitor, mouse, and keyboard along with a graphical user interface (GUI) for enabling configuration of the ANDSF server 200 such as by, for example, defining rules or policies stored in the policy rules and profiles storage 240. In some embodiments, the operator interface may enable presentation of a GUI to a remote server via the network interface 210. Various other operator interfaces 250 for enabling operator configuration of the ANDSF server 200 will be apparent. An operator may us the operator interface to define or modify policy rules, policy profiles, or network element objects utilized by the ANDSF server 200.

Figure 3:
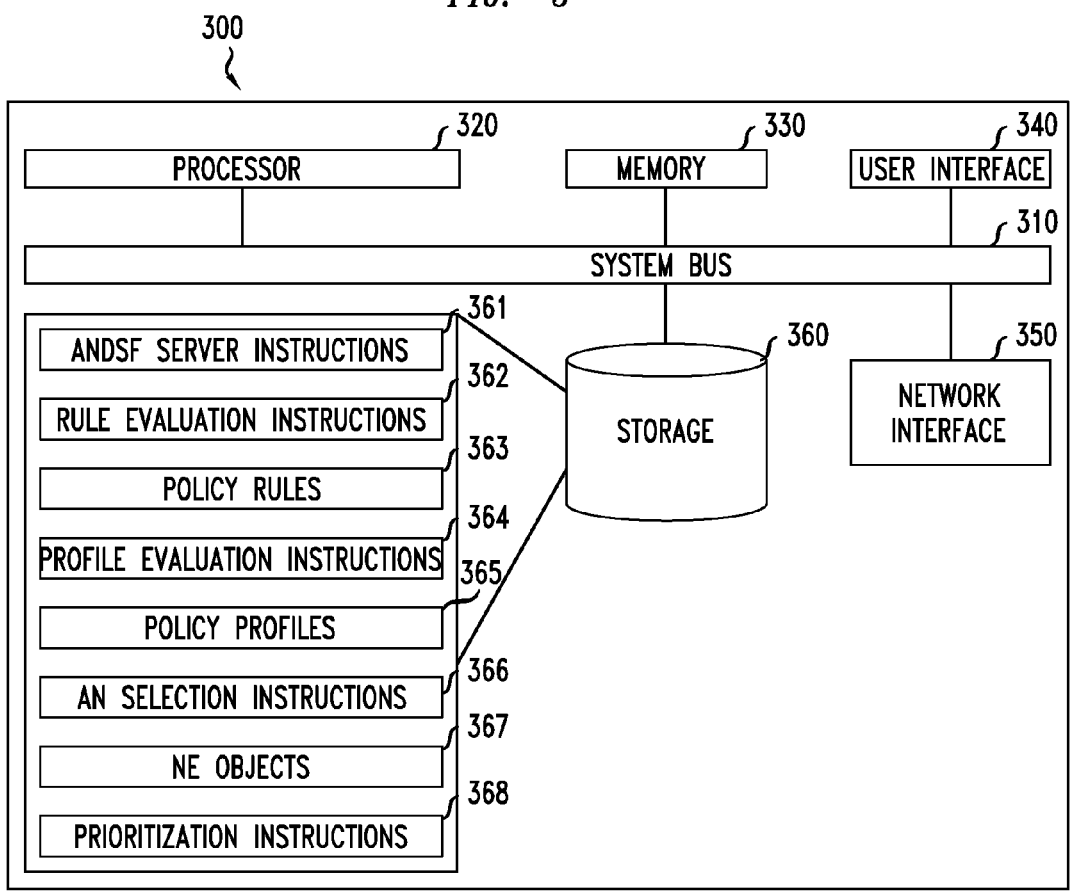
FIG. 3 illustrates an exemplary hardware diagram of an ANDSF server.

FIG. 3 illustrates an exemplary hardware diagram of an ANDSF server 300. The exemplary ANDSF server 300 may correspond to the ANDSF server 200 of FIG. 2 or the ANDSF server 160 of FIG. 1. As shown, the ANDSF server 300 includes a processor 320, memory 330, user interface 340, network interface 350, and storage 360 interconnected via one or more system buses 310. It will be understood that FIG. 3 constitutes, in some respects, an abstraction and that the actual organization of the components of the ANDSF server 300 may be more complex than illustrated.

The processor 320 may be any hardware device capable of executing instructions stored in memory 330 or storage 360. As such, the processor may include a microprocessor, field programmable gate array (FPGA), application-specific integrated circuit (ASIC), or other similar devices.

The memory 330 may include various memories such as, for example L1, L2, or L3 cache or system memory. As such, the memory 330 may include static random access memory (SRAM), dynamic RAM (DRAM), flash memory, read only memory (ROM), or other similar memory devices.

The user interface 340 may include one or more devices for enabling communication with a user such as an administrator. For example, the user interface 340 may include a display, a mouse, and a keyboard for receiving user commands.

The network interface 350 may include one or more devices for enabling communication with other hardware devices. For example, the network interface 350 may include a network interface card (NIC) configured to communicate according to the Ethernet protocol. Additionally, the network interface 350 may implement a TCP/IP stack for communication according to the TCP/IP protocols. Various alternative or additional hardware or configurations for the network interface 350 will be apparent.

The storage 360 may include one or more machine-readable storage media such as read-only memory (ROM), random-access memory (RAM), magnetic disk storage media, optical storage media, flash-memory devices, or similar storage media. In various embodiments, the storage 360 may store instructions for execution by the processor 320 or data upon with the processor 360 may operate. For example, the storage 360 may store ANSDF server instructions 361 for implementing basic ANDSF server functionality such as, for example, S14 session establishment and S14 message processing. The storage 360 may also store policy generation instructions and structures for use in generating policies to be provisioned to ANSDF clients. As such, the storage 360 may store rule evaluation instruction 362 for evaluating policy rules 363. Additionally or alternatively, the storage 360 may store profile evaluation instructions 364 for evaluating policy profiles 365. To support profile evaluation instructions 364, the storage 360 may also store access network selection rule evaluation instructions 366 for evaluating network element object 367 and prioritization instructions for prioritizing included network elements.

It will be apparent that various information described as stored in the storage 360 may be additionally or alternatively stored in the memory 330. For example, the user location log 365 may be additionally, alternatively, or partially stored in the memory 330. In this respect, the memory 330 may also be considered to constitute a "storage device." Various other arrangements will be apparent. Further, the memory 330 and storage 360 may both be considered to be "non-transitory machine-readable media." As used herein, the term "non-transitory" will be understood to exclude transitory signals but to include all forms of storage, including both volatile and non-volatile memories.

While the ANDSF server 300 is shown as including one of each described component, the various components may be duplicated in various embodiments. For example, the processor 320 may include multiple microprocessors that are configured to independently execute the methods described herein or are configured to perform steps or subroutines of the methods described herein such that the multiple processors cooperate to achieve the functionality described herein. In some embodiments, such as those wherein the ANSDF server is implemented in a cloud computing architecture, components may be physically distributed among different devices. For example, the processor 320 may include a first microprocessor in a first data center and a second microprocessor in a second data center. Various other arrangements will be apparent.

FIG. 4 illustrates an exemplary data arrangement 400 for storing policy rules. As such, the data arrangement 400 may be stored in a memory 330 or storage device 360 of the ANDSF server 300 and may reflect contents of the policy rules storage 220. It will be apparent that the data arrangement 400 may be an abstraction and may be stored in any manner known to those of skill in the art such as, for example, a table, linked list, array, database, or other structure. In some embodiments, the data arrangement 400 may be accessible using a query language such as, for example, the structured query language (SQL).

The data arrangement 400 includes a criteria field 410 and a result field 420. The criteria field 410 may indicate one or more conditions for determining whether a rule is applicable to a current context. The result field 420 may indicate information to be used in generating a policy when a rule is applicable.

As a first example, rule 430 indicates that it is to be applied when a tracking area code (TAC) of the UE is currently "0xA13." The rule 430 also indicates that, when applicable, two policy profiles, "ISMP Profile 1" and "ISRP Profile 7" are to be evaluated to generate a policy.

As another example, rule 440 indicates that it is to be applied when both a TAC of the UE is currently "0xA23" and a subscriber category of a subscriber associated with the UE is "GOLD." The rule 440 also indicates that, when applicable, three policy profiles, "ISMP Profile 8," "ISMP Profile 1," and "ISRP Profile 7" are to be used and potentially evaluated to generate a policy. In such a case where a rule lists multiple profiles directed to the same type of policy element (in this case, two policy profiles directed to creating an ISMP), the order of the profiles within the result may indicate the priorities to be assigned to the resultant components. For example, the ISMP created by ISMP Profile 8 may have a priority of "1," while the ISMP created by ISMP Profile 1 may have a priority of "2."

In some cases, no rule may be identified as applicable. In such cases, a default rule may be defined. As an example, rule 450 indicates that as a default action, two policy profiles, "ISMP Profile 10" and "ISRP Profile 10" should be evaluated to generate a policy. Such a default may be used where the current context does not match any criteria for other rules or where received location information is not defined for, or otherwise not understood by, the ANDSF server. Various other situations in which a default rule such as policy rule 450 may be useful will be apparent. The data arrangement may contain numerous additional policy rules 460.

It will be noted that location may be defined by values other than TAC. For example, a rule may be evaluated against a cell identifier, LAC, PLMN identifier, or GPS coordinates. In some embodiments, locations may be identified using an operator-defined "GeoFence." As will be described further below with respect to FIG. 5, a GeoFence may be associated with a geographic area on the ANSDF server but not known to the ANSDF clients. As an example, a rule (not shown) may indicate that it is applicable when the UE is currently (or anticipated to be) within the GeoFence identified as "Capitol Area."

FIG. 5 illustrates an exemplary data arrangement 500 for storing GeoFence definitions. As such, the data arrangement 500 may be stored in a memory 330 or storage device 360 of the ANDSF server 300. It will be apparent that the data arrangement 500 may be an abstraction and may be stored in any manner known to those of skill in the art such as, for example, a table, linked list, array, database, or other structure. In some embodiments, the data arrangement 500 may be accessible using a query language such as, for example, the structured query language (SQL).

The data arrangement 500 includes a GeoFence name field 510 and a locations field 520. The GeoFence name field 510 may provide a handle for each GeoFence, such that rules and other processes or structures may refer to a GeoFence. The locations field 520 may identify one or more non-GeoFence location identifiers to which the GeoFence corresponds.

As an example, GeoFence definition 530 indicates that a UE is considered within the "Capitol Area" GeoFence when the UE is reported to be located in any of the TACs "0x4E9," "0x4EA," or "0x4EB" Likewise, a UE may be predicted to be within the "Capitol Area" GeoFence in the future if the UE is predicted to enter any of these TACs. As another example, GeoFence definition 540 indicates that a UE is considered (or anticipated) to be within the "Mall" GeoFence when the UE is reported (or anticipated) to be located either within TAC "0xBB4" or PLMN "0x11." Various alternative methods of defining geographic locations will be apparent. For example, a geographic location may be defined by a point, such as GPS coordinates, along with a radius thereby identifying the area within the circle defined by the point and radius. The data arrangement 500 may include numerous additional GeoFence definitions 550.

FIG. 6 illustrates an exemplary data arrangement 600 for storing an inter system mobility policy (ISMP) profile. As such, the data arrangement 600 may be stored in a memory 330 or storage device 360 of the ANDSF server 300 and may reflect contents of the policy profiles storage 240. It will be apparent that the data arrangement 600 may be an abstraction and may be stored in any manner known to those of skill in the art such as, for example, a table, linked list, array, database, or other structure. In some embodiments, the data arrangement 600 may be accessible using a query language such as, for example, the structured query language (SQL).

The ISMP profile 600 may be used to generate an ISMP, as defined by the relevant 3GPP standards, for inclusion in a policy sent to an ANDSF client. As such, the ISMP profile 600 may specify various information to be included in the resultant ISMP. It will be apparent that the ISMP profile 600 may be a simplification in some respects and, as such, may omit some information that may be otherwise included in an ISMP profile. For example, as shown, the ISMP profile 600 does not specify any time of day information which, according to the relevant standards, may be included in an ISMP. In various embodiments, the ISMP profile 600 may additionally specify time of day information. Various additional information to include in an ISMP profile will be apparent.

As shown, the ISMP profile 600 includes a name field 610 identifying a name of "ISMP Profile 1." This name may be used by other components to reference the ISMP Profile 600. For example, policy rules 430, 440 both reference this name. As such, evaluation of these rules, when applicable, may involve evaluation of ISMP profile 600. The ISMP profile 600 may also include one or more values that are to be copied into the ISMP under construction. For example, the PLMN field 620 may indicate that the ISMP under construction should carry the value "444123" as a PLMN value. Similarly, the validity area field 640 may indicate that the Geofence "Capitol Area" should be used to define the validity area value for the generated ISMP. In various embodiments, the ANDSF server may first translate the GeoFence to a set of values that will be understood by the ANDSF client. For example, according to GeoFence definition 530, the ISMP may include 3GPP locations including TACs 0x4E9, 0x4EA, and 0x4EB as a validity area value.

In addition to defining information that is simply copied into an ISMP under construction, the ISMP profile 600 may also include information that may be used to adaptively or procedurally generate information to be included in the ISMP. For example, to generate the PrioritizedAccess values of the ISMP, the ISMP profile may identify a list of network elements to be considered in the list of network elements field 640. These identifications may correspond to separate network element objects that specify various information, such as access technology and access IDS, that will be included in the PrioritizedAccess values. Further, the use all network elements field 650 may include an indication of whether all network elements identified in the list of network elements field 640 should be included in the ISMP or whether the list should be pruned to produce an "available list." If the use all network elements field 650 is set to no, the ANDSF server may utilize an algorithm specified in the algorithm field 660 to determine whether to include each network element in the ISMP or in an available list that will be further evaluated and possibly reduced based on, for example, access network selection rules which will be described in greater detail below with respect to FIG. 8.

The algorithm field 660 may include a reference to an algorithm that the ANDSF server is configured to recognize and apply. For example, a value of "Same LAC" may refer to an algorithm that includes only those network elements located within the same LAC as the UE for which a policy is being generated. As another example, a value of "Same GeoFencing" may refer to an algorithm that includes only those network elements located within the same GeoFence as the UE for which a policy is being generated. In the example of FIG. 6, the algorithm field 600 includes a value of "proximity" which may refer to an algorithm that includes only those network elements within a predetermined distance from the UE. In some embodiments, the operator may be able to define algorithms either by installing "plug-ins" or writing algorithms according to a scripting or programming language understood by the ANDSF server.

Thus, in the example of FIG. 6, an ANDSF server may apply the proximity algorithm to return an available list of "NE2; NE4; NE7," because NE3 and NE8 may be determined, by the proximity algorithm, to be too far from the UE to be included. The ANDSF server would then proceed to retrieve information from the three network element objects associated with these respective handles to generate the PrioritizedAccess information to be included in the ISMP. As will be explained in greater detail below with respect to FIG. 10, generation of the PrioritizedAccess information may also include calculating a score for each of the three network elements and using the scored to set AccessNetworkPriority fields of the PrioritizedAccess information.

FIG. 7 illustrates an exemplary data arrangement 700 for storing an inter system routing policy (ISRP) profile. As such, the data arrangement 700 may be stored in a memory 330 or storage device 360 of the ANDSF server 300 and may reflect contents of the policy profiles storage 240. It will be apparent that the data arrangement 700 may be an abstraction and may be stored in any manner known to those of skill in the art such as, for example, a table, linked list, array, database, or other structure. In some embodiments, the data arrangement 700 may be accessible using a query language such as, for example, the structured query language (SQL).

The ISRP profile 700 may be used to generate an ISRP, as defined by the relevant 3GPP standards, for inclusion in a policy sent to an ANDSF client. As such, the ISRP profile 700 may specify various information to be included in the resultant ISRP. It will be apparent that the ISRP profile 700 may be a simplification in some respects and, as such, may omit some information that may be otherwise included in an ISRP profile. For example, as shown, the ISRP profile 700 includes information for generating flow-based criteria. Various alternative ISRP profiles may additionally or alternatively include information appropriate for generating service based criteria or non-seamless offload criteria. Information for inclusion in such alternative ISRP profiles will be apparent in view of the following and the relevant standards.

As shown, the ISRP profile 700 includes a name field 705 identifying a name of "ISRP Profile 7." This name may be used by other components to reference the ISRP Profile 600. For example, policy rules 430, 440 both reference this name. As such, evaluation of these rules, when applicable, may involve evaluation of ISRP profile 700. The ISRP profile 700 may also include one or more values that are to be copied into the ISMP under construction. For example, the PLMN field 710 may indicate that the ISRP under construction should carry the value "310010" as a PLMN value.

The ISRP profile 700 may also include one or more fields that are specific to various types of ISRP. In the example of FIG. 7, the ISRP profile 700 is useful for creating an ISRP using flow-based criteria. As such, the ISRP profile 700 includes a flow based criteria field 715 for storing or otherwise identifying information specific to a flow-based policy. For example, the flow based criteria field 715 includes a reference to a separate flow-based criteria object, "FB1." For the sake of simplicity, the contents of the flow-based criteria object "FB1" are illustrated as belonging to the ISRP profile itself in fields 720-750. In various alternative embodiments, the flow-based criteria field 715 may not reference an external object and, instead, directly contain the information to be used in the ISRP.

As shown, the flow based criteria field 715 may include, or point to an object including, an IP flows field 720. The IP flows field 720 may specify IP flows to which the ISRP will apply, either directly or by pointing to an external object. In the example of FIG. 7, the IP flows field 720 references an external object, "ipFlow2," the contents of which are shown in fields 725-735 for the sake of simplicity. In various alternative embodiments, the IP information may be defined directly within the flow based criteria object "FB1" or the ISRP profile 700. As shown, an IP flow may be associated with a source range field 725, a destination range field 730, and an application field 735. It will be apparent that various alternative information may be included to define an IP flow such as, for example, quality of service (QoS) or domain name information. In the example of FIG. 7, the resulting ISRP may identify itself as applicable to IP flows providing a streaming video application, from a source IP and port between 1.1.1.1:111 and 2.2.2.2:222, and to a destination IP and port between 3.3.3.3:133 and 4.4.4.4:144. Such information may be included within the ISRP to help the ANDSF client select IP flows to which the ISRP applies.

The flow based criteria field 715 may also include, or point to an object including, routing criteria. The routing criteria field 740 may specify criteria for selecting an ISRP, either directly or by pointing to an external object. In the example of FIG. 7, routing criteria field 740 references an external object, "RC1," the contents of which are shown in fields 745,750 for the sake of simplicity. In various alternative embodiments, the routing criteria may be defined directly within the flow based criteria object "FB1" or the ISRP profile 700. As shown, routing criteria may be associated with a validity area field 745 and a time of day field 750. It will be apparent that various alternative information may be included to define an IP flow such as, for example, an APN. In the example of FIG. 7, the resulting ISRP may identify itself as applicable when the UE is within the GeoFence identified as "Capitol Hill" and between Nov. 11, 2014 at 9 AM and Nov. 12, 2014 at 11 AM. Such information may be included within the ISRP to help the ANDSF client determine when the ISRP is applicable.

The flow based criteria field 715 may also include a routing rules field 755 for specifying one or more network elements to be used when an ISRP generated by the ISRP profile 700 is used. Similar to the list of network elements field 640 of the ISMP profile 600, the routing rules field 755 may reference one or more network element objects. As shown, the ISRP 700 identifies five network element objects, "NE2; NE3; NE4; NE7; NE8."

As noted above, the ISRP profile 700 applies to a flow-based ISRP. The techniques described herein are also applicable to create ISRP profiles (not shown) that apply to service-based and non-seamless offload ISRPs. For example, the ISRP profile 700 may be modified to include, instead of the flow based criteria field 715 (and any child fields 720-755), a service based criteria field (not shown) or a non-seamless offload criteria field (not shown) including the information appropriate to defining such alternative criteria within an ISRP.

In various embodiments, the ISRP profile 700 may fully specify the information for inclusion within a generated ISRP. In such embodiments, the ANDSF server may only reformat the information into the appropriate ISRP format for inclusion within the ISRP forwarded to the ANDSF client. In other embodiments, various adaptive or procedural generation may also be employed, such as that described above with reference to the ISMP profile 600. For example, the ISRP profile 700 may alternatively specify an algorithm for use in generating an "available list" that removed one or more network elements from the list specified in the routing rules field 755. Further, the ANDSF server may apply access network selection rules defined by the various network element objects to create an "applicable list" that may further eliminate some network elements from the list. Furthermore, the ANDSF server may apply one or more score formulae, according to the methods described herein, to the network elements to generate relative priorities for the network elements to be included within the RoutingRule information carried by the generated ISRP.

FIG. 8 illustrates an exemplary data arrangement 800 for storing a network element object. As such, the data arrangement 800 may be stored in a memory 330 or storage device 360 of the ANDSF server 300 and may reflect contents of the network element objects storage 260. It will be apparent that the data arrangement 800 may be an abstraction and may be stored in any manner known to those of skill in the art such as, for example, a table, linked list, array, database, or other structure. In some embodiments, the data arrangement 800 may be accessible using a query language such as, for example, the structured query language (SQL).

The network element object 800 stores various information relating to an access point that may be used by various UEs to access a network. As shown, the network element object 800 includes a name field 805 identifying a name of "NE2." This name may be used by other components to reference the network element object 800. For example, the ISMP profile 600 and ISRP profile 700 both reference this name. As such, in evaluating the ISMP profile 600 or ISRP profile 700, the ANDSF server may be configured to access the network element object 800 to retrieve various information for inclusion in the policy element or for use in procedurally generating information for such use. For example, as noted above, the ANDSF server may calculate scores for network elements based on a utilization value and weight value. As such, the network element object 800 may include a utilization field 810 and a weight field 815. As shown, the utilization field 810 may store a value of "0," which may have been received in a recent periodic network status report sent by an external node. The weight field 815 may indicate a weight of "40" which may have been assigned by the operator of the ANDSF server.

As also described above, various network elements may be associated with access network selection rules for use by the ANDSF server in determining whether to exclude a network element from a policy element. To this end, the network element object 800 includes an access network selection rules field 820. The access network selection rules field 820 may include one or more criteria for evaluation by the ANDSF server in a manner similar to the evaluation described in relation to the policy rules. If any of the criteria are applicable, the ANDSF server may decide to exclude the network element. As an example, the access network selection rules field 820 of the network element object 800 indicates that the network element NE2 should be excluded from an ISMP or ISRP when either the subscriber is not a "PLATINUM" category subscriber or when the utilization of the network element has been reported to be "80."

The network element object 800 may also include information that may be used by the algorithms described above for excluding network elements from an available list. For example, the network element object may include a geo location field 825 indicating a real world location of the associated network element. In the example, the network element is shown to be located at GPS coordinates "33.759; −84.401." This information may be used, for example, as part of the "proximity" algorithm to calculate how close the UE is to the associated network element.

The network element object 800 may also include various information that may be copied into the policy element. As shown, the network element object 800 may include a time of day field 830, custom data field 835, and an access type field 840. The access type fields 840 may be associated with additional fields such as, for example, an SSID field 845, BSSID field 850, and access information field 855. The information stored in these fields may correspond to various fields carried by components of a policy as defined by the relevant specifications. The meanings and placement of such additional information within a policy and by an ANDSF client will be apparent.

Figure 9:
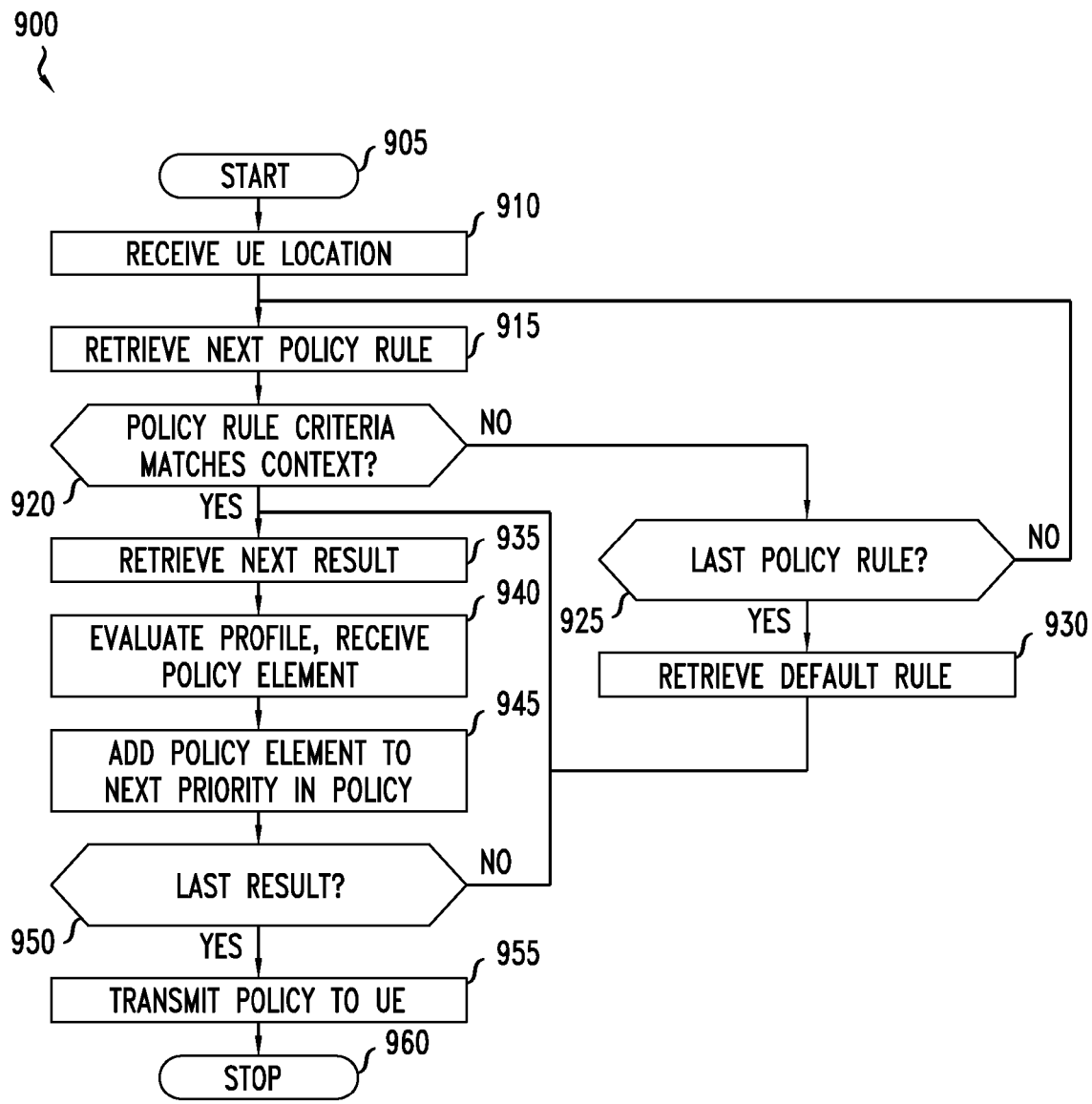
FIG. 9 illustrates an exemplary method for generating a policy.

FIG. 9 illustrates an exemplary method 900 for generating a policy. The method 900 may be performed by the components of an ANDSF server, such as the rules engine 215, profile evaluation engine 225, access network selection rule evaluation engine 235, and network element prioritization engine 245 of the exemplary ANDSF server 200. The method 900 may be executed whenever the ANDSF server determines that policies should be provided to an ANDSF client such as, for example, upon receiving a PULL request from the ANDSF client or upon determining that a policy should be PUSHED to the ANDSF client.

The method may begin in step 905 and proceed to step 910, where the ANDSF server may receive a UE location to use in generating the policy. The UE location may be reported by the ANDSF client via a policy PULL request, a previously reported location, or an anticipated future location. Next, in step 915, the ANDSF server retrieves a policy rule for evaluation. In various embodiments wherein the policy rules are ordered, the ANDSF server may retrieve the next policy rule according to the order. In step 920, the ANDSF server may begin evaluation of the rule by determining if the current context matches the criteria specified by the policy rule. For example, the ANDSF server may determine whether the UE location matches a location specified by the policy rule. Various other criteria will be apparent in view of the foregoing. If the criteria matches the current context, the method 900 proceeds to step 935. Otherwise, the method 900 proceeds to step 925 where the ANDSF server determines whether any additional criteria-based policy rules remain for consideration. If so, the method 900 loops back to step 915 to evaluate additional policy rules. Otherwise, the ANDSF server may locate a default rule in step 930 and the method 900 proceeds to step 935. In various embodiments, the default rule may not be set apart from the other policy rules; instead, the default rule may include universally-met criteria (or be otherwise recognized by the ANDSF server as always applicable) and may simply be located at the end of the ordered list of policy rules. In such embodiments, steps 925 and 930 may be omitted as separate steps because their functions may already be performed by step 920.

In step 935, the ANDSF server retrieves a result from the policy rule result section. In various embodiments, wherein the results are ordered within each policy rule result section, the ANDSF server retrieves the first result, which may be a reference to a policy profile. In step 940, the ANDSF server evaluates the policy profile to generate a policy element, such as an ISRP or ISMP. In step 945, the ANDSF server may add the policy element to the policy under construction at the next highest priority available for the policy element type. For example, if the ANDSF server generates the third ISRP for the policy, the ANDSF server may add the ISRP to the policy with a priority value of "3."

In step 950, the ANDSF server may determine whether additional results remain in the policy rule for evaluation. If so, the method 900 may loop back to step 935 to evaluate the additional results. Otherwise, the ANDSF server may proceed to transmit the policy to the ANDSF client on the appropriate UE. The method 900 may then proceed to end in step 955.

It will be apparent that the method 900 may be a simplification in some respects. For example, it will be understood that, while various methods for generating ISMPs and ISRPs for inclusion within a policy are described herein, additional information may be included in a policy. For example, a policy may also include discovery information. Such discovery information may be inserted into the policy at any appropriate point and may include evaluation of a network element object to retrieve the information to be included.

Figure 10:
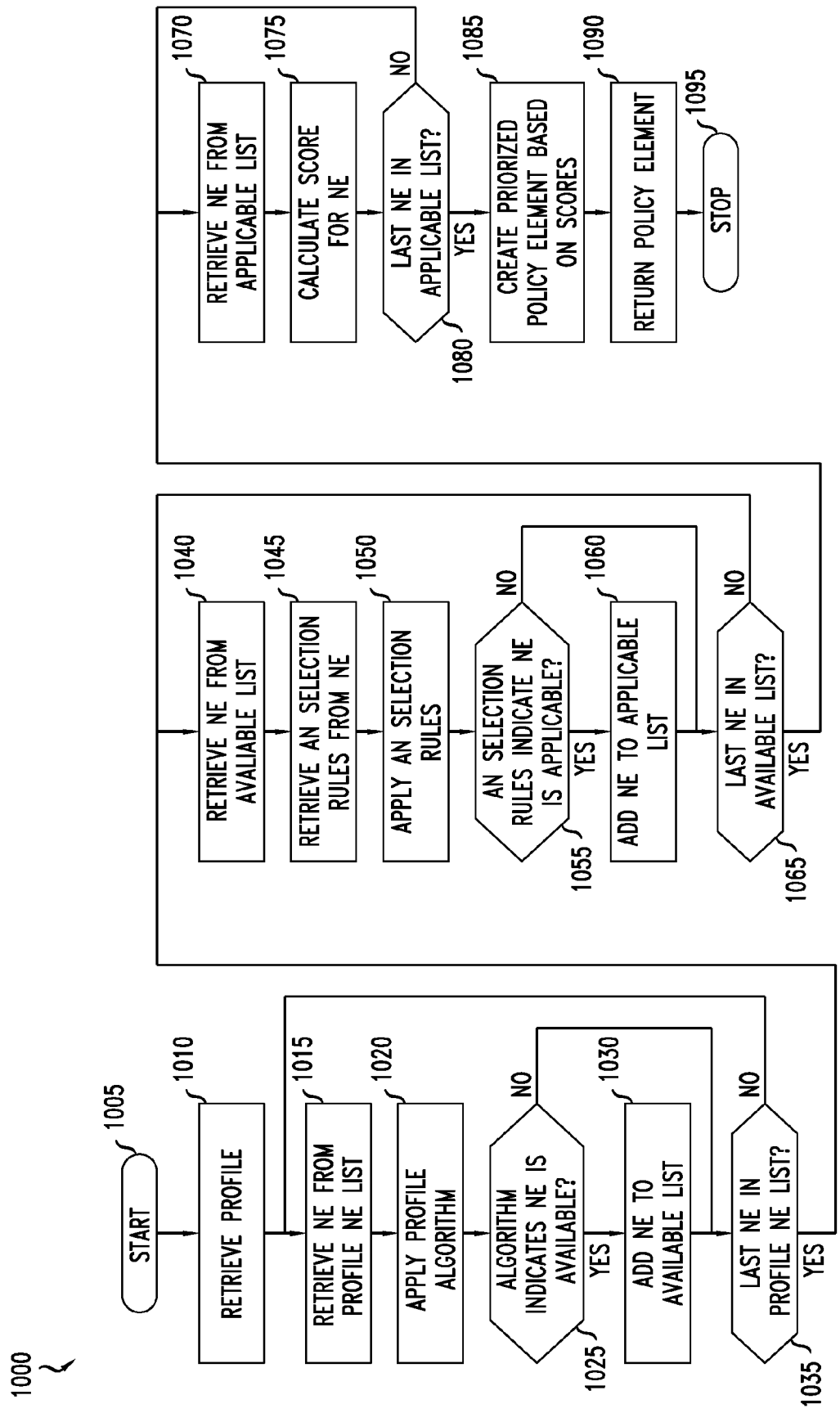
FIG. 10 illustrates an exemplary method for evaluating a policy profile.

FIG. 10 illustrates an exemplary method 1000 for evaluating a policy profile. The method 1000 may be performed by the components of an ANDSF server, such as the profile evaluation engine 225, access network selection rule evaluation engine 235, and network element prioritization engine 245 of the exemplary ANDSF server 200. In various embodiments, the method 1000 may correspond to step 940 of the method 900 for generating a policy.

The method 1000 may begin in step 1005 and proceed to step 1010 where the ANDSF server retrieves a profile for evaluation. For example, in various embodiments, the method 1000 may be invoked by a rules engine or other ANDSF server component based on a profile name. In such embodiments, the ANDSF server retrieves a profile associated with the identified name. As noted above, the profile may identify a list of network elements, some of which may be included in the policy element under construction. The ANDSF server may begin the processor of potentially eliminating some network elements from the list in step 1015 by retrieving a network element from the profile. Then, in step 1020, the ANDSF server applies one or more algorithms specified by the profile to the network element to determine whether the network element should be excluded. Evaluation of the algorithm may also include an access to an associated network element object identified by the network element name. For example, where the profile indicates that a "proximity" algorithm should be used, the ANDSF server may execute the proximity algorithm to decide whether the location of network element, as indicated by the associated network element object, is close enough to the UE for potential inclusion in the policy element. In step 1025, the ANDSF server evaluates the result of the algorithm to determine if the network element is considered available to the UE. If so, the ANDSF server adds the network element to the available list, which may be further processed for additional network element exclusion. The ANDSF server then determines, in step 1035, whether additional network elements remain in the profile to be evaluated. If so, the method 1000 loops back to step 1015. Otherwise, the method 1000 proceeds to step 1040 where the ANDSF proceeds to further process the available list and potentially eliminate additional network elements.

In step 1040, the ANDSF server retrieves a network element from the available list for further evaluation. Then, in step 1045, the ANDSF server retrieves any access network selection rules carried by the associated network element object and, in step 1050, applies the access network selection rules. For example, the ANDSF server may evaluate criteria carried by the rules such as determining whether a recently-reported utilization for the network element passes a specified value. In step 1055, the ANDSF server determines whether the evaluation of the rules indicates that the network element is considered applicable to the UE. For example, in some embodiments, the ANDSF server may consider a network element applicable only if each of the criteria specified by the access network selection rules evaluates to a "false" value. If the access network selection rules evaluation determines that the network element is applicable, the ANDSF server adds the network element to an applicable list in step 1060. The ANDSF server then determines, in step 1035, whether additional network elements remain in the available list to be evaluated. If so, the method 1000 loops back to step 1040. Otherwise, the method 1000 proceeds to step 1070 where the ANDSF proceeds to prioritize the applicable list.

In step 1070, the ANDSF server retrieves a network element from the applicable list. In step 1075, the ANDSF server calculates a score for the network element according to a score formula. For example, the ANDSF server may use a hard-coded formula or a formula that has been preconfigured by the ANDSF server operator. In some embodiments, the ANDSF server may refer to the network element object to determine which score formula to use. After calculating a score, the ANDSF server determines, in step 1080, whether additional network elements remain in the applicable list for score calculation. If so, the method 1000 loops back to step 1070. Once a score has been calculated for each network element in the applicable list, the method 1000 proceeds to step 1085, where the ADSF server creates a prioritized policy element, such as an ISMP or ISRP. The policy element may identify each of the network elements from the applicable list along with a priority. In some embodiments, the network element with the lowest calculated score may be assigned a priority of one, the network element with the second lowest calculated score may be assigned a priority of two, and so on.

Various other methods of using scores to assign priorities will be apparent. Step 1085 may also include completing other portions of the policy element such as, for example, copying values from the network element object or policy profile into the policy element. Various alternative embodiments may complete at least some of these other portions at other times. For example, the policy element may be initialized and provided with validity area and PLMN information after step 1010.

It will further be apparent that various procedures of 1000 may be omitted or provided in a different order. For example, steps similar to steps 1040-165 may be performed prior to steps similar to steps 1015-1035, such that access network selection rules are applied to eliminate network elements prior to application of the algorithm specified by the profile. Further, steps 1070-1085 may be omitted, such that another method of prioritization is employed. For example, the network elements may be assigned a priority based on the order in which the network elements are listed by the profile. Various other arrangements will be apparent.

In view of the foregoing, various embodiments enable flexible generation and provision of policies to an ANDSF client. For example, by generating profiles based on operator defined policy rules, policy profiles, or network element objects, an operator may easily define and extend the behavior of an ANDSF server. Various additional benefits will be apparent in view of the foregoing.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by an access network discovery and selection function (ANDSF) server for provisioning policies, the method comprising:

identifying, by an ANDSF server, a location associated with a user equipment device (UE) in communication with the ANDSF server via an S14 session established over a first access network;

determining, by the ANDSF server, a plurality of access points for use by the UE to utilize at least one access network other than the first access network;

calculating, by the ANDSF server, a first score, using a first score formula, for a first access point of the plurality of access points;

calculating, by the ANDSF server, a second score, using the first score formula, for a second access point of the plurality of access points;

calculating a third score, using a second score formula other than the first score formula, for a third access point of the plurality of access points, wherein the policy additionally identifies the third access point associated with a third priority that is determined based on a comparison of the third score to the first and second score;

generating, by the ANDSF server, a policy identifying the first access point associated with a first priority and the second access point associated with a second priority, wherein the first priority is set higher than the second priority based on a comparison of the first score to the second score;

and transmitting the policy to the UE via the S14 session over the first access network.

2. The method of claim 1, wherein identifying the location comprises receiving, from the UE, a request for a policy, wherein the request identifies the location as a current location of the UE.

3. The method of claim 1, wherein the first score formula comprises a weight assigned to a respective access point and a recent utilization rating of the respective access point.

4. The method of claim 1, wherein the first score formula is previously configured by an operator to be used by the ANDSF server.

5. The method of claim 1, wherein:

determining the plurality access points comprises evaluating a policy profile to generate a list of access points including the first access point and the second access point; and generating the policy comprises creating a first policy element based on the policy profile, wherein the first policy element identifies the first access point associated with the first priority and the second access point associated with the second priority, and wherein the first policy element is at least one of an inter system routing policy (ISRP) and an inter system mobility policy (ISMP).

6. The method of claim 5, wherein:

the policy includes a second policy element that is at least one of an ISRP and an ISMP, the first policy element is associated with a first element priority within the policy, and the second policy element is associated with a second element priority within the policy.

7. An access network discovery and selection function (ANDSF) server for provisioning policies, the ANDSF server comprising:

a network interface in communication with a first access network;

a storage device; and a processor in communication with the network interface and the storage device, wherein the processor is configured to:

identify a location associated with a user equipment device (UE) in communication with the ANDSF server via an S14 session established over the network interface;

determine a plurality of access points for use by the UE to utilize at least one access network other than the first access network;

calculate a first score, using a first score formula, for a first access point of the plurality of access points;

calculate a second score, using the first score formula, for a second access point of the plurality of access points;

calculate a third score, using a second score formula other than the first score formula, for a third access point of the plurality of access points, wherein the policy additionally identifies the third access point associated with a third priority that is determined based on a comparison of the third score to the first and second score;

generate a policy identifying the first access point associated with a first priority and the second access point associated with a second priority, wherein the first priority is set higher than the second priority based on a comparison of the first score to the second score; and transmit the policy to the UE via the S14 session over the network interface.

8. The ANDSF server of claim 7, wherein, in identifying the location, the processor is configured to receive, from the UE, a request for a policy, wherein the request identifies the location as a current location of the UE.

9. The ANDSF server of claim 7, wherein the first score formula comprises a weight assigned to a respective access point and a recent utilization rating of the respective access point.

10. The ANDSF server of claim 7, wherein the first score formula is previously configured by an operator to be used by the ANDSF server.

11. The ANDSF server of claim 7, wherein:

in determining the plurality access points, the processor is configured to evaluate a policy profile retrieved from the storage device to generate a list of access points including the first access point and the second access point; and in generating the policy, the processor is configured to create a first policy element based on the policy profile, wherein the first policy element identifies the first access point associated with the first priority and the second access point associated with the second priority, and wherein the first policy element is at least one of an inter system routing policy (ISRP) and an inter system mobility policy (ISMP).

12. The ANDSF server of claim 11, wherein:

the policy includes a second policy element that is at least one of an ISRP and an ISMP, the first policy element is associated with a first element priority within the policy, and the second policy element is associated with a second element priority within the policy.

13. A non-transitory machine-readable storage medium encoded with instructions for execution by an access network discovery and selection function (ANDSF) server for provisioning policies, the non-transitory machine-readable storage medium comprising:

instructions for identifying, by an ANDSF server, a location associated with a user equipment device (UE) in communication with the ANDSF server via an S14 session established over a first access network;

instructions for determining, by the ANDSF server, a plurality of access points for use by the UE to utilize at least one access network other than the first access network;

instructions for calculating, by the ANDSF server, a first score, using a first score formula, for a first access point of the plurality of access points;

instructions for calculating, by the ANDSF server, a second score, using the first score formula, for a second access point of the plurality of access points;

instructions for calculating a third score, using a second score formula other than the first score formula, for a third access point of the plurality of access points, wherein the policy additionally identifies the third access point associated with a third priority that is determined based on a comparison of the third score to the first and second score;

instructions for generating, by the ANDSF server, a policy identifying the first access point associated with a first priority and the second access point associated with a second priority, wherein the first priority is set higher than the second priority based on a comparison of the first score to the second score; and instructions for transmitting the policy to the UE via the S14 session over the first access network.

14. The non-transitory machine-readable storage medium of claim 13, wherein the first score formula comprises a weight assigned to a respective access point and a recent utilization rating of the respective access point.

15. The non-transitory machine-readable storage medium of claim 13, wherein the first score formula is previously configured by an operator to be used by the ANDSF server.

16. The non-transitory machine-readable storage medium of claim 13, wherein:

the instructions for determining the plurality access points comprise instructions for evaluating a policy profile to generate a list of access points including the first access point and the second access point; and the instructions for generating the policy comprise instructions for creating a first policy element based on the policy profile, wherein the first policy element identifies the first access point associated with the first priority and the second access point associated with the second priority, and wherein the first policy element is at least one of an inter system routing policy (ISRP) and an inter system mobility policy (ISMP).

17. The non-transitory machine-readable storage medium of claim 16, wherein:

the policy includes a second policy element that is at least one of an ISRP and an ISMP, the first policy element is associated with a first element priority within the policy, and the second policy element is associated with a second element priority within the policy.

* * * * *